(No Model.)  7 Sheets—Sheet 1.

O. STEIGER.
CALCULATING MACHINE.

No. 558,913.  Patented Apr. 21, 1896.

Witnesses:
M. C. Massie
A. J. Birney

Inventor:
Otto Steiger
by Max Georgii
Atty.

(No Model.) 7 Sheets—Sheet 2.

O. STEIGER.
CALCULATING MACHINE.

No. 558,913. Patented Apr. 21, 1896.

Witnesses:
M. C. Massie
A. J. Birney

Inventor:
Otto Steiger
by Max Georgii atty.

(No Model.) 7 Sheets—Sheet 4.
O. STEIGER.
CALCULATING MACHINE.

No. 558,913. Patented Apr. 21, 1896.

Witnesses:
M. C. Massie.
A. J. Birney

Inventor:
Otto Steiger
by Max Georgii
Atty.

(No Model.) 7 Sheets—Sheet 6.

O. STEIGER.
CALCULATING MACHINE.

No. 558,913. Patented Apr. 21, 1896.

Witnesses:
M. C. Massie.
A. J. Birney

Inventor:
Otto Steiger
by Max Georgii
Atty.

UNITED STATES PATENT OFFICE.

OTTO STEIGER, OF MUNICH, GERMANY.

CALCULATING-MACHINE.

SPECIFICATION forming part of Letters Patent No. 558,913, dated April 21, 1896.

Application filed September 17, 1895. Serial No. 562,759. (No model.)

*To all whom it may concern:*

Be it known that I, OTTO STEIGER, a citizen of Switzerland, residing in Munich, Bavaria, Germany, have invented certain new and useful Improvements in Calculating-Machines, of which the following is a specification.

My invention relates to improvements in arithmetical machines, and particularly to that class of calculators generally described in my former patent.

The essential part of this invention is a controlling mechanism, which may be said to be a mechanical representative of the multiplication-table from $0 \times 0$ to $9 \times 9$, inclusive, and which is generally described in said former specification. The controlling mechanism in this special case consists of a series of recessed plates, two recesses to correspond to each product, one recess for the tens, and a second recess for the units, for each of the eighty-two products of that part of the multiplication-table.

A mechanism, termed the "transferring mechanism," is employed to transfer the partial products to another mechanism, which I term the "combining and registering mechanism," as it registers or indicates the total result on a series of dials.

My invention also consists in a factor-indicating mechanism, by means of which, in multiplication, the multiplier is indicated on the machine as soon as the operation is completed. This mechanism indicates also the quotient when the apparatus is used for division.

My invention consists, further, in such features, details, and combinations of parts as will first be described in connection with the accompanying drawings and then particularly pointed out in the claims.

As my invention will be most readily understood in connection with the operation of multiplication, the calculating-machine will first be described as if designed for that purpose only, after which the changing of it to perform the other operations—viz., division, addition, and subtraction—will be entered into.

In the accompanying drawings, Figures 1 to 27 illustrate one form of mechanism embodying my invention.

In describing the first form of mechanism.

In describing the mechanism shown in Figs. 1 to 27 it becomes advisable, for the sake of perspicuity, to consider it under the following heads: First, the controlling devices and means for setting them to any required position. Second, the transferring mechanism, which transfers the various partial products determined by the controlling devices to the combining and recording mechanism. Third, the combining and registering mechanism, which takes the partial products from the transferring mechanism and combines them, either by adding or subtracting, and indicates or shows the final result on suitable dials. Fourth, the factor-indicating mechanism, which partakes so much of the nature of the remainder of the machine as to be more readily described under three subdivisions also—viz., the controlling mechanism, the transferring mechanism, and the registering mechanism.

For the sake of brevity the description of each of these three subdivisions will be combined with the description of its appropriate main division of the mechanism.

It is to be carefully observed in connection with the above enumeration of the four principal parts that a distinction is here drawn between the use of the terms "registering mechanism" and "factor-indicating mechanism," the former relating to that mechanism which registers the products obtained by the transferring mechanism, while the latter refers to one particular branch of the apparatus, which registers the subsequent positions of the multiplier-lever D, operating the controlling-block.

The registering mechanism is an essential feature of the machine, while the factor-indicating mechanism is only a convenience, it being possible to construct and operate a machine without it, as the operator might carry in his memory the numbers marked by the different positions of the multiplier-lever D or write them down in succession as the operation proceeds.

It should be observed that, though only a convenience, the factor-indicating mechanism is a most important convenience, since it serves as a check to show whether or not the multiplier-lever has been swung in the right positions, according to the different digits of the multiplier.

The controlling mechanism of the machine to be described consists of nine pairs of recessed plates $I^a$ $I^b$, $II^a$ $II^b$, up to $IX^a$ $IX^b$, one pair for each number from "1" up to "9," and one further plate $O^b$, the function of which will be entered into hereinafter.

The recessing of the plates is done upon the same general principle as fully explained in the former specification, a recess representing a certain number of graduations, according to the distance of its bottom from the zero-line.

Figures 9, 10, 11, 12, 24, 25, 27:
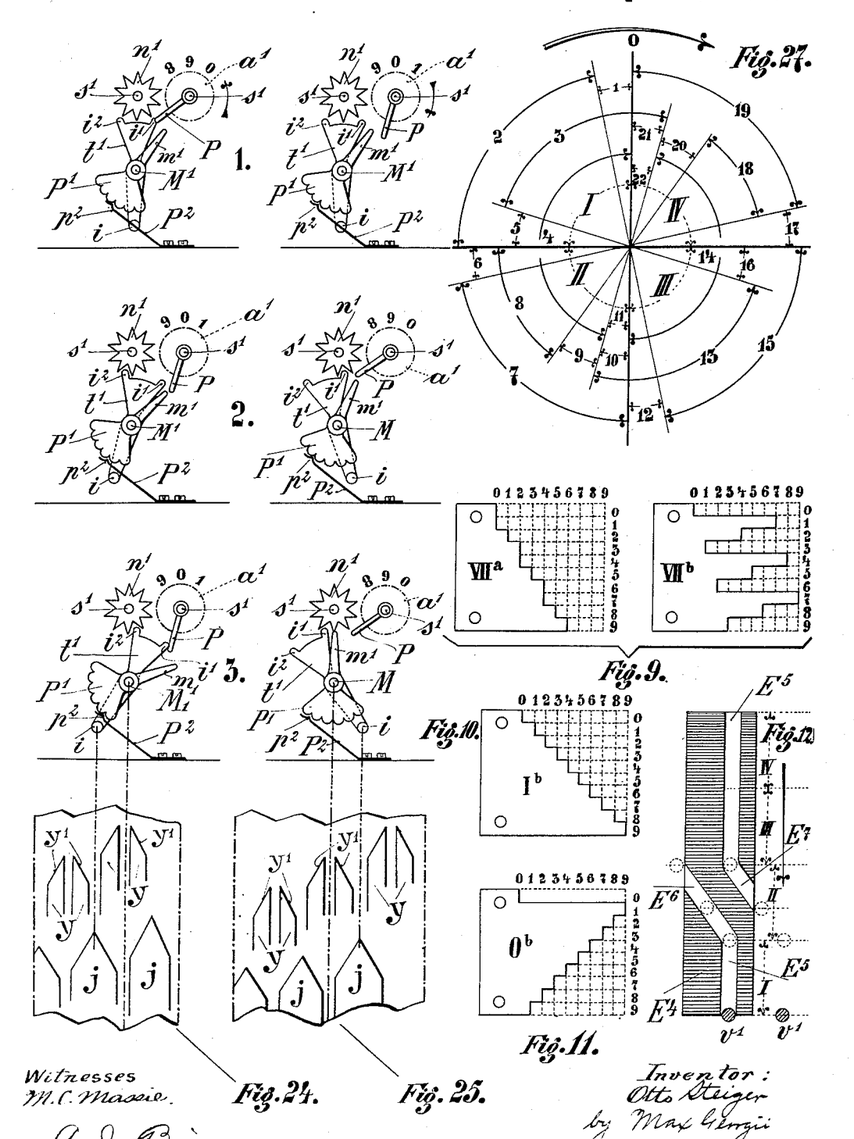
Figs. 9, 10, and 11 are enlarged details of the controlling-block.
Fig. 12 is a developed view of the surface of the carriage-shifting cam.
Figs. 24 and 25 show the different positions of the transferrers for carrying the tens in multiplication and division.
Fig. 27 is a diagram showing the succession and simultaneousness of the different operations occurring in the machine during one revolution of the main driving-shaft.

One pair of recessed plates, representing the products of $0 \times 7$, $1 \times 7$, $2 \times 7$, up to $9 \times 7$ is shown on an enlarged scale in Fig. 9, $VII^a$ representing the tens and $VII^b$ the units of the different products.

In Fig. 9 the numerals on the horizontal line mark the number of graduations of the recesses, while the vertical row of numerals corresponds with the numbers with which 7 is multiplied. Each product is represented by two recesses on the same horizontal line, the recess on plate $VII^a$ giving the tens, the other recess in plate $VII^b$ giving the units of that special product. According to this we find for the product $0 \times 7$, on the recesses marked 0, neither tens nor units. For the product $1 \times 7$ we obtain, in recess 1 on $VII^a$, no tens; in recess 1 on $VII^b$, seven units, the product being 7. For the product $4 \times 7 = 28$ we find in recess 4 on $VII^a$ two tens and on the corresponding recess on $VII^b$ eight units, the product being 28, and so on for every other product. For the product $0 \times 1$ up to $9 \times 1$ only one plate, $I^b$, Fig. 10, is needed, as all the products have only units.

Fig. 11 shows a plate similar to the plate $IX^b$, which is provided for the indicating mechanism when the apparatus is used for division. Its function will be explained hereinafter.

Figures 8, 21, 23:
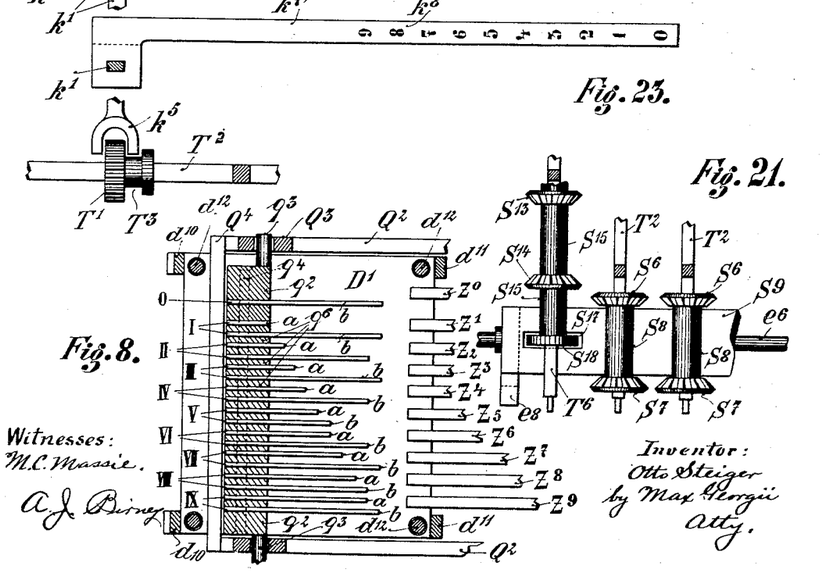
Fig. 8 is an enlarged top view of the controlling-block.

The controlling-plates are mounted in a controlling-block, as shown in Fig. 8, by means of two screws $q^4$, and separated by pieces $q^6$. To each side of the block a guide-piece $q^5$ is fixed, vertically movable in a loop $Q^3$ of the guide-rods $Q^2$.

As all the products containing the same factor are arranged in a horizontal line on the different plates, the whole block has to be raised or lowered vertically to get the recesses corresponding to the number with which we wish to multiply opposite the ends of the racks Z.

The controlling-block is guided horizontally in its longitudinal and transverse movement by two parallel plates D', connected together by means of vertical bars $d^{11}$ and vertically movable along guide-rods $d^{12}$.

Figure 1:
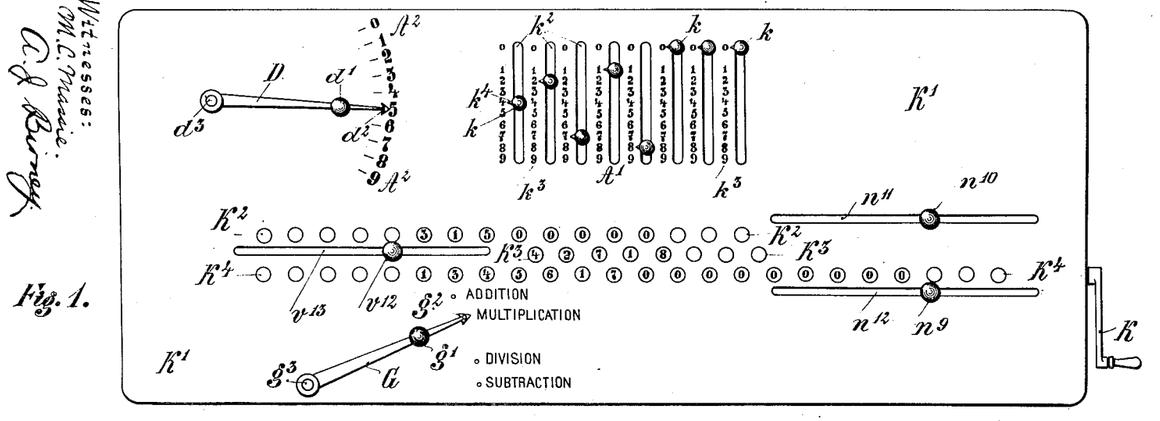
Fig. 1 is a plan view of the outside of the apparatus.
Figure 2:
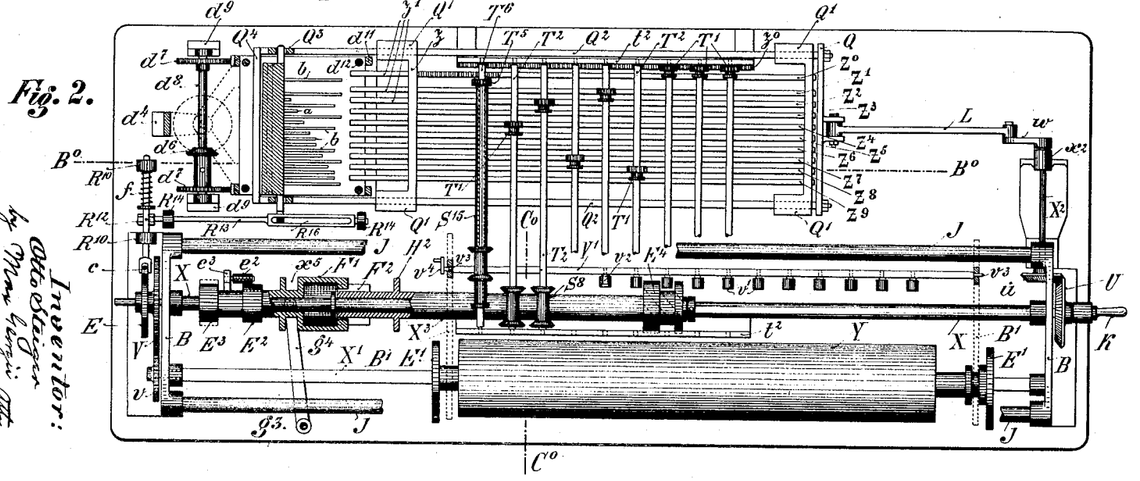
Fig. 2 is is a plan view of the inside, with a partial section along the line $A^0 A^0$, Fig. 3, the top plate and the carriage being removed.
Figure 3:
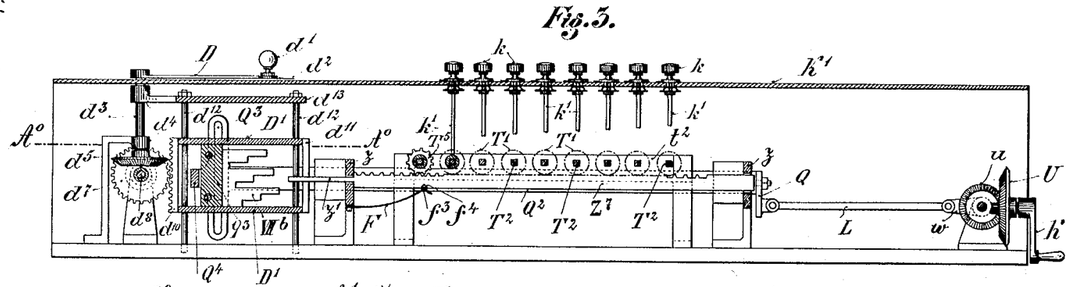
Fig. 3 is a longitudinal vertical section on the line $B^0 B^0$, Fig. 2.

It will be seen from the arrangement of the plates in Figs. 1, 2, and 3 that for setting the controlling-block these plates have to be raised or lowered. A lever D, which I term the "multiplier-lever," (as it has to be swung in different positions, according to the figure of the multiplier,) is swung over a scale $A^2$, the multiplier-scale, until its pointer $d^2$ indicates the number with which we want to multiply. By this operation rotation is imparted to the vertical shaft $d^3$, rotating in bearings $d^4$ and carrying on its end a bevel-wheel $d^5$, which meshes into another bevel-wheel $d^6$, fixed to a horizontal shaft $d^8$, mounted in bearings $d^9$. This shaft carries two gear-wheels $d^7$, meshing into racks $d^{10}$, fixed to the plates D' and raising or lowering the plates, as well as the controlling-block, according to the direction of rotation. The radii of the bevel-wheels and the gear-wheels are so proportioned that while the pointer $d^2$ travels over the distance between two adjacent figures of the multiplier-scale $A^2$ the controlling-block is raised or lowered equal to the width of one recess.

When the pointer $d^2$ is on the figure "5," all the recesses containing the factor "5" in the different plates will be exactly opposite the ends of the racks Z.

Figs. 2 and 8 show the position of the controlling-block for the normal position of the crank K, and it will be noticed that the tens-plates, which are marked $a$, are opposite the racks Z.

Figure 20:
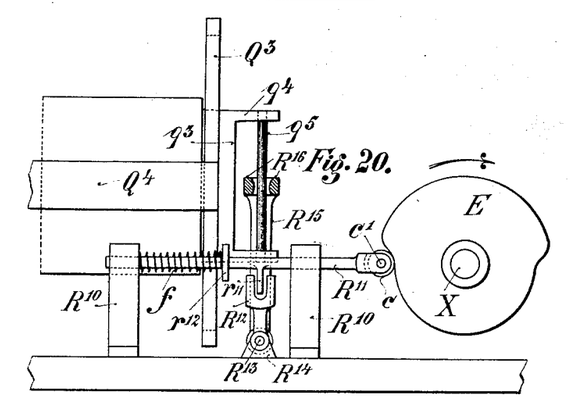
Fig. 20 is an enlarged end view of the mechanism for shifting the controlling-block transversely.

For shifting the controlling-block transversely, in order to get the units-plates $b$ opposite the racks, a mechanism, as shown in Fig. 20, is employed. The plan view of this mechanism is also shown in Fig. 2.

A cam-wheel E is attached to the main driving-shaft X, actuated by the hand-crank K. A guide-rod $R^{11}$, sliding horizontally in guide-boxes $R^{10}$ and carrying a roller $c$, is pressed against the cam E by means of a helical spring $f$. A projection $r^{11}$ of the guide-rod $R^{11}$ enters between the prongs of a fork $R^{12}$. This fork is fixed to a horizontal shaft $R^{13}$, held by bearings $R^{14}$, and carrying by means of two arms $R^{15}$ a grooved rail $R^{16}$, which forms a guide for a vertical rod $q^5$, attached to projections $q^4$ of the controlling-block. The grooved rail $R^{16}$ will guide the controlling-block parallel to the racks, whatever may be its position relative to the multiplier-lever D or the cam E.

As long as the cam-face with the smaller radius is in contact with the roller $c$ the tens-plates of the controlling-block will be opposite the racks. The cam-face with the larger radius corresponds to the units-plates opposite the racks.

One rotation of the crank K causes two rotations of the shaft $X^2$ by means of the bevel-gears U $u$, Figs. 2 and 3. The small crank $w$ therefore forces the controlling-block to make two outward movements by means of connecting-rod L, cross-bar Q, and guide-rods $Q^2$. The guide-rods $Q^2$ carry on their ends vertical guides $Q^3$, which allow the controlling-block to be shifted vertically, but impart to it the same horizontal movement at any position. The controlling-block is guided, as shown before, by the plates D′ and the grooved rail $R^{16}$.

The cam E rotates once in the same time and shifts the controlling-block during the end play after the first rotation of the small crank $w$ transversely, and takes it back to the normal position during the end play of the second rotation of the small crank $w$.

The transferring mechanism which transfers the products from the controlling devices to the registering and combining mechanism will now be described. This consists, primarily, of a series of transferring-racks $Z^0$, $Z'$, $Z^2$, up to $Z^9$, Figs. 2 and 3, arranged in a horizontal plane and mounted in suitable guide-frames $z$, which permit the free longitudinal movement of each rack. The rack $Z^0$ relates to the factor-indicating mechanism when the apparatus is used for division. Each rack is provided at its left end with a point $z'$, adapted to enter into the recesses of the controlling-plates.

A series of leaf-springs F, normally engaged with their ends $f^3$ in notches $f^4$ on the under side of the racks, prevent the racks from accidental movement between the beginning of the outward movement of the guide-rods $Q^2$ and the cross-bar Q and the time when the controlling devices start the outward movement of the racks.

The racks are cogged on their upper surfaces, and any one of the racks $Z'$ to $Z^9$ is adapted to engage with any one of a series of pinions T′, which may be termed the "counting-pinions" for convenience of reference hereinafter. These counting-pinions are each provided with square central openings, through which is passed a square revoluble pinion-shaft $T^2$, by which construction each pinion may be moved longitudinally on its shaft, yet when revolved will impart its motion to its pinion-shaft.

The pinion-shafts $T^2$ are mounted transversely over the racks Z in bearings $t^2$, fixed to the frame. Each pinion-shaft is also provided with a pair of oppositely-beveled gear-wheels $S^6$ $S^7$, which are fixed on a sleeve $S^8$, having a square central opening. By this construction the longitudinal movement of each sleeve is permitted, while at the same time the rotary motion of each pinion-shaft will turn the sleeve and the gear-wheels also, Figs. 4 and 21.

The sleeves are united in a suitable manner to a longitudinal bar $S^9$, Figs. 4, 13, and 21, moving transversely by means of cam-wheels $E^2$ $E^3$ on the main driving-shaft X, as will be more clearly explained hereinafter.

Each counting-pinion T′ is provided with a grooved extension or neck $T^3$, engaged by the forked lower end $k^5$ of a stud $k$, Figs. 1, 2, 3, and 22. The shanks $k'$ of the sliding studs $k$ project through slots $k^2$ in the plate K′, which is secured to the frame and bears on its upper face a series of scales $k^3$, Fig. 1, graduated from "1" to "9," these graduations being such that when an index or pointer $k^4$ of the sliding studs is alined with any one of them the counting-pinion of such stud will be in engagement with the rack which enters the recesses of that pair of controlling devices having products of which said graduation forms one factor. For example, if any one of the sliding studs $k$ be moved longitudinally until its pointer $k^4$ is in line with the graduation marked, say, "8," the counting-pinion which is engaged by such sliding stem will be in mesh with the rack $Z^8$, which is the rack lying opposite that pair of plates marked VIII$^a$ and VIII$^b$ in Figs. 2 and 8, and containing recesses which give all the products of 8 from $0 \times 8$ to $9 \times 8$.

It will be noticed that each scale $k^3$ is preceded by the figure "0," the interval between "0" and "1" being larger than the distance between succeeding figures. The normal position of each sliding stud is with its pointer opposite the "0" which precedes its respective scale, in which position its counting-pinion is engaged in rack $Z^0$, fixed to the frame, and cannot be revolved.

When a counting-pinion is in mesh with a rack, the said pinion will be rotated by any movement of such rack, it being obvious that the amount of rotation and its direction will be determined by the amount and direction of the longitudinal movement of the rack.

As one rotation of the crank K imparts two reciprocations to the controlling mechanism, the racks will be pushed outward twice, their movement beginning each time as soon as the bottoms of the recesses just opposite engage the pointed ends $z'$ of the racks. The racks will be pushed back twice to their normal position by the cross-bar Q.

As previously stated, the ends of the racks are normally opposite the tens-plates of the controlling-block, leaving the necessary end play for shifting the controlling mechanism and engaging the bevel-wheels $S^6$ and $S^7$ before the movement of the racks begins.

As the depth of the recesses in the plates varies according to the products to be represented, so the movement of the racks will vary, those entering the deepest recesses being the last to start their outward movement. The racks first engaged by the recessed plates will have the greatest longitudinal movement. So also the rotation of the counting-pinions T' will vary. For example, if the rack $Z^7$ were opposite the recess marked "5" in the plate VII$^a$, Figs. 8 and 9, it would be pushed forward three graduations on its first outward movement and five graduations on its second outward movement, corresponding to the three tens and five units of the product $5 \times 7 = 35$. During the inward movement the racks travel back a corresponding number of graduations to get into their normal positions again.

It is to be understood that if a rack is opposite a recess marked "0" it has no movement at all and is secured in its normal position by the leaf-spring F.

The rack $Z^0$ is a part of the factor-indicating mechanism and is only cogged for a small distance, as it has to be engaged with pinion $T^5$ only. The pinion $T^5$ is normally located between the racks $Z^0$ and $Z'$. A sleeve $S^{15}$, having a square central opening, is shiftable longitudinally on the square pinion-shaft $T^6$, which I term the "indicator pinion-shaft." The sleeve $S^{15}$ carries on one end the pinion $T^5$ and on the other end a pair of bevel-wheels $S^{13}$ and $S^{14}$ as well as a collar $S^{18}$, engaging a slot $S^{17}$ of the cross-bar $S^9$, Fig. 21. To shift the sleeves $S^8$ longitudinally on their respective pinion-shafts for the purpose of engaging the bevel-wheels $S^6$ or $S^7$ and $S^{13}$ or $S^{14}$ with the bevel-wheels $S^{12}$ of the registering-spindles and $S^{16}$ of the factor-indicating spindles a cross-bar $S^9$ is provided. This function will be fully described hereinafter, Fig. 4.

It will be seen from the arrangement of the sleeve $S^{15}$, Figs. 2 and 21, that the pinion $T^5$ will be in mesh with the rack $Z'$ when the bevel-wheels $S^6$ and $S^{13}$ are engaged with their respective bevel-wheels, this being the case when the apparatus is used for multiplication, and it will be in mesh with the rack $Z^0$ in division when the bevel-wheels $S^7$ and $S^{14}$ are coupled with their respective spindles. This feature will be referred to hereinafter.

When the pinion $T^5$ is engaged with the rack $Z'$, as is the case in multiplication, it will not be rotated during the first outward and the first inward movement of the controlling-block, as the controlling device opposite the rack $Z'$ has no recesses for the tens of the product. During the second outward and second inward movement it will be rotated as many graduations as correspond to the figure on scale $A^2$, to which the multiplier-lever D is swung, and thus rotate the respective factor-indicator dial for a corresponding amount.

To illustrate, clearly, the operation of all the mechanism thus far described, the following example will be given: Suppose it is desired to multiply 42,718 by 5. The first thing to do is to place the lever G, Figs. 1 and 5, with its pointer $g^2$ in the position marked "multiplication." Then the multiplicand, preferably the one containing the greatest number of figures, is arranged on the scales $k^3$ of keyboard A' in the following manner: The first left-hand sliding stud $k$, Fig. 1, is moved over its scale $k^3$ until its pointer $k^4$ is opposite the figure "4," thereby engaging its counting-pinion T' with the rack $Z^4$. The next stud to the right is then shifted until its pointer is opposite the figure "2," thereby engaging its counting-pinion with rack $Z^2$, and so on until the fifth stud from the left is shifted to the figure "8" of its respective scale $k^3$, thereby engaging its counting-pinion with the rack $Z^8$. This completes the setting of the multiplicand.

As will be noticed by the above description and by Fig. 1, the multiplicand thus arranged will appear in a zigzag line on the keyboard A'. As it is rather awkward to check a number quickly when arranged in the above manner, I provide the machine with devices which show the multiplicand in a straight line, thus facilitating the checking considerably.

Figures 7, 22:
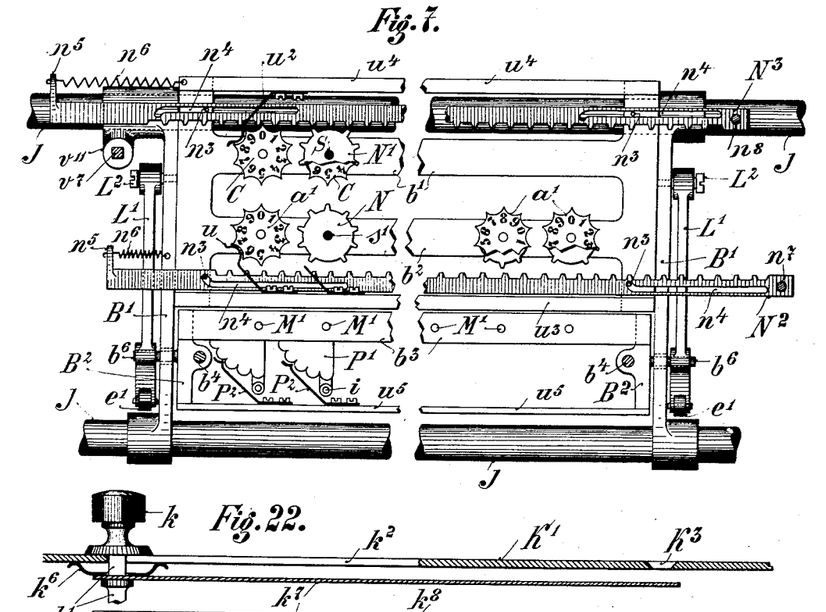
Fig. 7 is a broken enlarged plan view of the carriages.
Figs. 21, 22, and 23 are detail views.

To the stud $k$, Fig. 22, is fixed a band of metal carrying a scale similar to the scales $k^3$, but being arranged in an opposite direction, as shown in Fig. 23. Only one figure of this scale appears at one time at a hole $K^3$ in the top plate K'.

As will be readily understood, any number to which the pointer of the stud $k$ is shifted will be shown in one of the holes of row $K^3$, Fig. 1, and makes the checking of the multiplicand very easy. To hold the studs $k$ in any required position, they are crowded against the top plate K' by means of strong leaf-springs $k^6$.

After the multiplicand is arranged the multiplier-lever is swung to one side or the other until its pointer stands on the figure corresponding to the first figure to the left of the multiplier and the crank K turned one complete rotation, this process being repeated for each figure of the multiplier. When the multiplier-lever is swung to the figure "5" on scale $A^2$, the controlling-block will be raised or lowered until the recesses indicating the products of $5 \times 0$ to $5 \times 9$ are opposite the ends of the racks Z, the tens-plates coming first into engagement.

For multiplying 42,718 by 5, the partial products obtained will be 20, 10, 35, 5, and 40, of which the tens are transferred first by what I term the "primary rotation" of the counting-pinions, while the units are transferred by the "secondary rotation." The numbers of the primary rotation are marked "P," those of the secondary rotation being marked "S," in the following example:

```
       4     2     7     1     8
      P S   P S   P S   P S   P S
      2 0   1 0   3 5   0 5   4 0
```

At the time the controlling-block makes its first outward movement the racks $Z^4$, $Z^2$, $Z^7$, and $Z^8$ will be moved outward for two, one, three, and four graduations, the rack $Z'$ not being moved at all, as the partial product $5 \times 1$ does not contain any tens. The respective counting-pinions and pinion-shafts will rotate for the same number of graduations, and will transfer their rotation to the registering-dials, as will be described hereinafter. The partial results, appearing on the dials $a'$ in a row of holes $K^4$, will be thus:

```
      P   P   P   P   P
      2   1   3   0   4
```

During the first backward movement of the controlling-block the partial product will be shifted one place to the left by an arrangement to be fully described hereinafter. At the same time the controlling-block is shifted transversely until the units-plates are opposite the racks. During the second outward movement of the controlling-block the racks $Z^7$ and $Z'$ will be moved for five graduations, the racks $Z^4$, $Z^2$, and $Z^8$ remaining stationary, as the products of their respective figures with 5 do not contain any units.

```
      P   P   P   P   P
      2   1   3   0   4
      S   S   S   S   S
      0   0   5   5   0
      ─────────────────
      2   1   3   5   9   0
```

During the secondary rotation of the counting-pinions their pinion-shafts will be engaged with the register-spindles which were one place to their right during the primary rotation. Therefore the numbers of the secondary rotation are added to the numbers of the primary rotation of the next place to the right and thus give to each graduation transferred its real value.

A special mechanism is provided for carrying the tens which are obtained when the number of graduations transferred by the primary of the secondary rotation, added to the number already transferred to the same dial, make a sum surpassing ten. This mechanism will be described hereinafter.

The mechanism which gives to each graduation transferred its proper value is contained in the combining and register mechanism. This mechanism consists, primarily, of a register-carriage and a revoluble cylinder Y, Figs. 2, 4, and 5.

The register-carriage consists of what I term the "main carriage," carrying the register-dials, and an "auxiliary carriage." The register-carriage is longitudinally movable on two hollow guides J, this being effected automatically by a special carriage-shifting mechanism or by hand.

The auxiliary carriage has, in addition to the longitudinal movement, a vertical movement with relation to the main carriage. The object of the auxiliary carriage and the revoluble cylinder is merely to carry the tens mentioned above.

Figure 5:
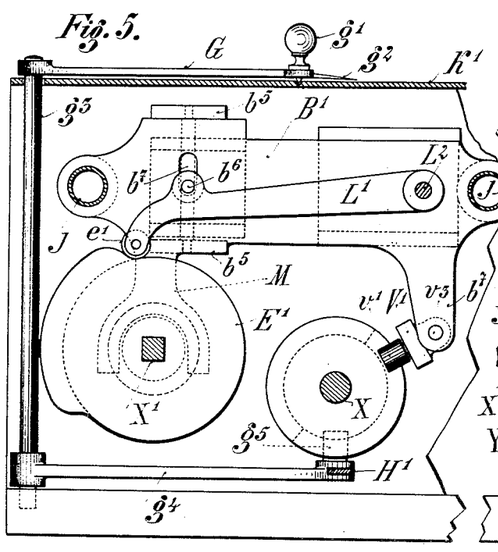
Fig. 5 is an enlarged end view of the carriages.
Figure 6:
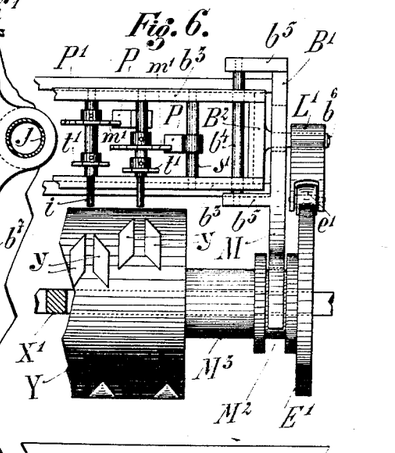
Fig. 6 is a broken enlarged vertical view of the carriages.

The main carriage consists of two end plates $B'$, Figs. 5, 6, and 7, connected together by bearing-bars $b'$ $b^2$, the bars $b'$ bearing a series of indicator-spindles S, while the bars $b^2$ bear a series of register-spindles $s'$. The number of the latter is equal to the number of places in the greatest product or dividend which the apparatus is constructed to receive, while the number of the former is equal to the number of step-by-step movements the register-carriage can make between the frames B B, Fig. 2.

Each register-spindle carries on its lower end a bevel-wheel $S^{12}$, adapted to be engaged with either of the two bevel-wheels $S^6$ $S^7$ on the pinion-shafts $T'$, thereby being rotated in either direction. The diameter of the counting-pinion is such that the bevel-wheels and spindles will rotate one-tenth of a revolution for each graduation traveled by the racks Z.

Figure 4:
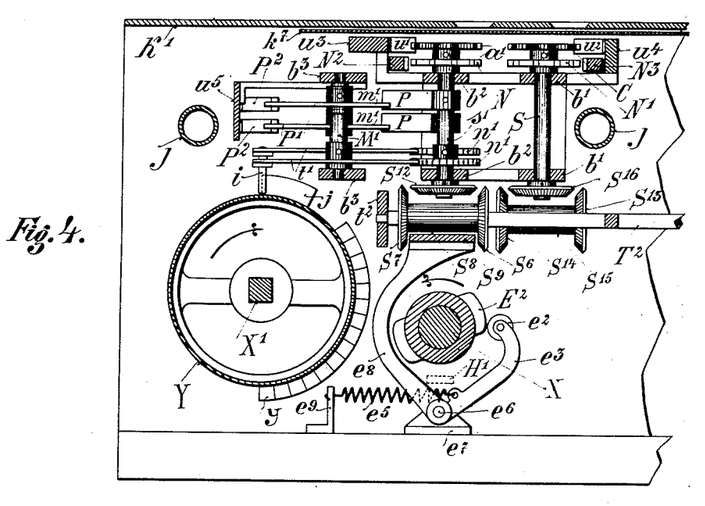
Fig. 4 is an enlarged cross-section through the carriages on line $C^0 C^0$, Fig. 2.

To each register-spindle is fixed a star-wheel $n'$, Fig. 4, having ten teeth, a finger P, a mutilated cog-wheel N, and a register-dial $a'$, carrying at equal intervals ten figures, from "0" to "9," and having ten notches, into which enter the rounded ends of a leaf-spring $u'$, thus securing the position of the register-spindle after each tenth of a revolution.

To each indicator-spindle is attached, in addition to a bevel-wheel $S^{16}$, a mutilated cog-wheel $N'$ and an indicator-dial C similar to the register-dials $a'$ on the register-spindles and secured by a leaf-spring $u^2$. The leaf-springs $u'$ and $u^2$ are mounted on bars $u^3$ and $u^4$, fixed to the end plates $B'$ of the carriage.

Figure 15:
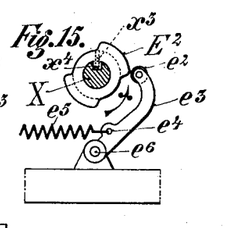

To engage and disengage the bevel-wheels S, the following construction is used: Two cam-wheels $E^2$ $E^3$, Figs. 2, 13, and 15, are mounted on a sleeve $X^4$. This sleeve $X^4$ is longitudinally movable along the main driving-shaft X, a pin $x^3$ entering in a groove $x^4$ of said shaft, thus imparting any rotation of the main shaft to said cams.

Figure 16:
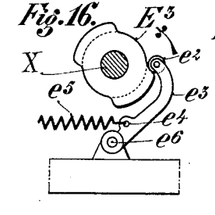
Figure 17:
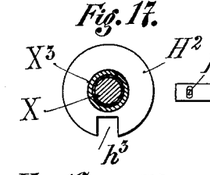

In Fig. 15, $E^2$ is the cam used in multiplication and addition, while the cam $E^3$, Fig. 16, is provided for the operation of division and subtraction.

Each cam is divided into four equal sectors, the opposite cam-faces having the same radii. The radii of the surface of maximum throw on cam $E^2$ and of minimum throw on cam $E^3$ are equal. These surfaces will, for the purpose of reference hereinafter, be termed the "mean surfaces." When the roller $e^2$ rides on the mean surface of either cam, the bar $S^9$ will be in its mean (normal) position and the bevel-wheels on the sleeves will not be in engagement either with the bevel-wheels on the register-spindles or with those on the indicator-spindles.

During the operation of multiplication, a roller $e^2$, mounted in an arm $e^3$, is forced against the face of the cam $E^2$ by a helical spring $e^5$, fixed to the arm $e^3$ at $e^4$ and to the frame by means of a bracket $e^6$, Fig. 4. As soon as the main shaft starts its rotation in the direction indicated by an arrow the roller $e^2$ will ride down to the smaller surface of cam $E^2$, and by this rotate the shaft $e^6$. This shaft $e^6$, with bearings at $e^7$, carries two brackets $e^8$, to which is fixed a bar $S^9$, adapted to shift the sleeves $S^8$ and $S^{15}$ longitudinally on their respective pinion-shafts $T^2$ and $T^6$, thus engaging bevel-wheels $S^6$ and $S^{12}$, as well as $S^{13}$ and $S^{16}$, Figs. 4, 13, and 21. During the first fourth of a rotation of the crank K these bevel-wheels will remain engaged and thus transfer the primary rotation of the pinion-shaft to the register-spindles. During the second fourth of a rotation the roller $e^2$ will ride on the mean surface of the cam, the bevel-wheels thus not being engaged during the first backward movement of the racks. During the third fourth of a rotation, corresponding to the secondary rotation of the pinions, the cam $E^2$ throws the bevel-wheels into engagement for a second time, and disengages them again for the last fourth of a rotation.

In the bearing-bars $b^3$, Figs. 4, 6, and 7, of the auxiliary carriage are mounted a series of dog-spindles M', each provided with a finger $m'$, arranged to be engaged by the finger P of the register-spindle one place to the right of the spindle directly behind it. Each finger $m'$ is provided with an arm P'', which is sector-shaped, as shown in Figs. 24 and 25, the periphery of each sector having five notches, one at the center and two at each side of the center. A leaf-spring $P^2$, secured to the bar $u^5$ of the auxiliary carriage, has its free end bent to form a tooth $p^2$, which is arranged to enter any one of the notches in its respective sector-arm, thereby preventing any accidental movement of the finger or of the dog-spindle, and engaging the other notches according to the direction in which the dog-spindle is rotated and the amount of such rotation. This will be better understood when taken in connection with the operation of the dog-spindles and their attached parts, which will be described hereinafter.

To each dog-spindle is fixed a transferring dog $t'$ of the shape shown in Figs. 24 and 25, each having an arm provided with a pin $i$, and having two teeth $i'$ and $i^2$, arranged to engage with the teeth of a star-wheel $n'$, directly opposite it.

Figure 26:
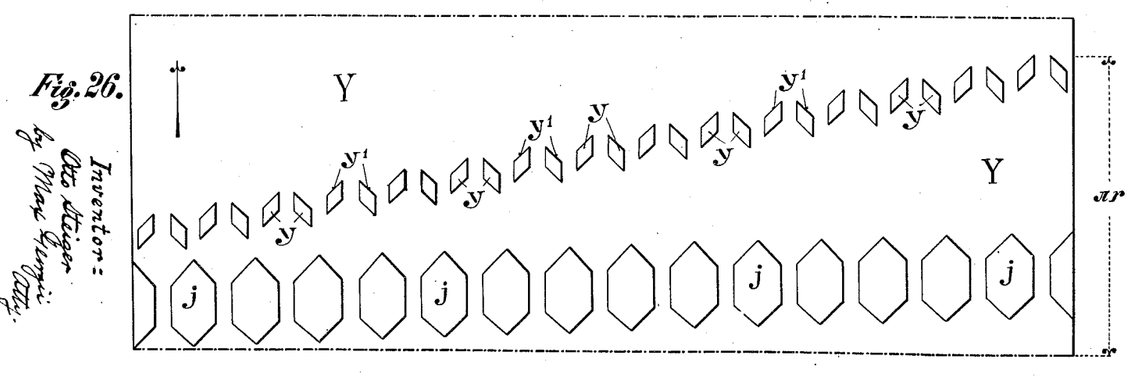
Fig. 26 is a developed view of the surface of the revoluble cylinder.
Figures 28, 29, 31:
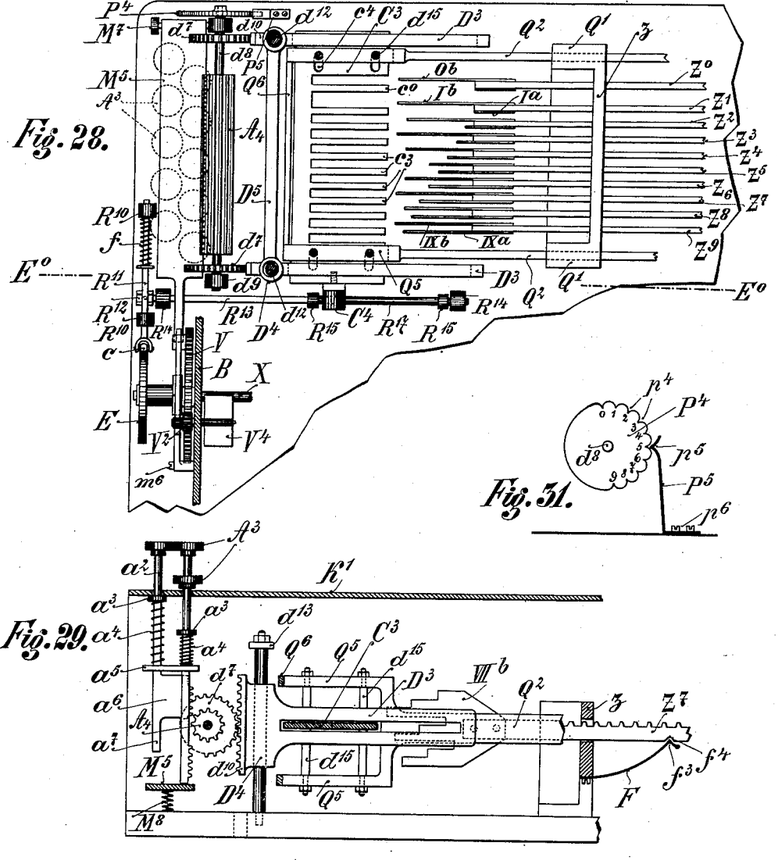
Figs. 28 to 31 illustrate another form operated by a suitable motor.
Figure 30:
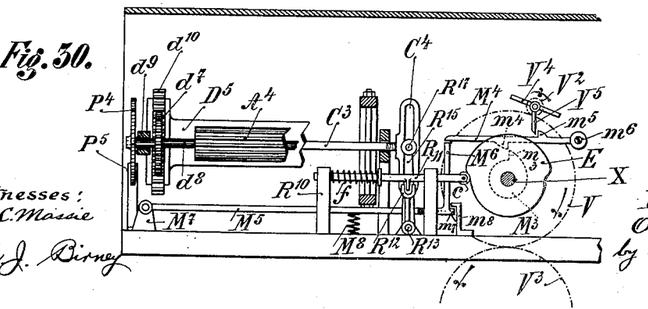

The cylinder Y, of which Fig. 26 is a developed view, is provided with two sets of projections, one set consisting of a series of helically-arranged cam-teeth $y$, the inclined surface $y'$ of one tooth of each pair being sloped in a direction opposite to that of the other, and the teeth of each pair being so located as to leave a passage between them. The second set of projections consists of a series of doubly wedged-shaped cam-teeth $j$, arranged a short distance apart, so as to leave a passage between them, these passages being in line with the passages between the individual teeth of each pair of projections $y$.

When the spindles of the register-dials are rotated one cycle, their fingers P contact with the finger $m'$ of the dog-spindles to the left of the one directly opposite to the register-spindle carrying that special finger P, whereby the transferring-dog is swung in one direction or the other, according to the rotation of the register-spindles. Figs. 24 and 25 fully illustrate this operation.

The cylinder Y is so located that as it revolves the pins $i$ of the transferring-dogs will enter the passages between the helically-arranged cam-teeth when the said dogs are in their normal position—i. e., when they are in the position 1, Figs. 24 and 25. When, however, the dogs are swung in either direction, their pins $i$ will contact with the inclined surfaces $y'$ of one or the other tooth of their respective pair, according to the direction in which the dogs have been swung, whether to the right or to the left. As soon as the pins contact with the inclined surfaces of the teeth the cylinder, by its rotation, will force the dogs farther over in the direction in which they were started by the fingers, whereby one or the other of the teeth $i'$ $i^2$ is engaged with its respective star-wheel $n'$ and rotates the latter one-tenth in one direction or the other.

It will be apparent from the above that whenever a register-dial is revolved one complete turn in either direction it moves the adjacent register-dial at the left one-tenth of a revolution. Therefore when a pinion-shaft on the transferring mechanism is caused to make a partial revolution, according to the number of graduations the racks are moved outward, the register-dial with which it is coupled will rotate for the same number of graduations, as the said register-dial bears a graduated series of ten figures on its periphery, running from "0" to "9."

On account of the primary and secondary rotation of the register-spindles the dial $a'$ may be rotated for more than one entire cycle during one turn of the crank K. As soon as the dial has completed one entire rotation, or as soon as it rotates from "9" to "0" in multiplication and addition, or from "0" to "9" in division and substraction, the adjacent register-dial on the left will rotate one-tenth of a revolution in a corresponding direction.

As the cylinder Y continues to revolve, the pins of the dogs which have been swung to one side will be brought into contact with one or the other inclined surface of the wedge-shaped teeth $j$, whereby the dogs will be restored to their normal positions.

It will be plain that when the transferring dogs are swung forward by the fingers P, or backward by the cam-teeth $j$, they would interfere with the rotation of their respective dials if the dogs were at the time in engagement with the star-wheels. To prevent this the auxiliary carriage is lifted to its upper position during the primary and secondary rotation of the register-spindles. The fingers P will always engage the fingers $m'$, while the transferring-dogs are only engaged with the star-wheels when the auxiliary carriage is in its lower position and when the transferring mechanism is not engaged with the register mechanism.

The fingers P and $m'$, as well as the transferring-dogs, are arranged alternately in two parallel planes, so that they do not interfere with their respective rotation.

The lifting of the auxiliary carriage is accomplished by means of cam-wheels E', Figs. 2, 5, and 6, fixed to the sleeve $M^3$ of the cylinder Y. A forked arm M of the end plate B', entering into the groove $M^2$, forces the cylinder to move longitudinally with the register-carriage, but does not interfere with its rotation imparted by the square shaft X'.

The teeth $y$ on the cylinder Y are arranged helically, for the reason that by this construction the dogs are swung one at a time, commencing at the right and ending at the left, thus not only reducing the power necessary to rotate the cylinder, but also permitting the transferring-dogs to carry a ten throughout an entire series of figures. For example, if the recording-dials show the number, say, "999,999" and the number "1" be received from the transferring mechanism to be added to the above number, this "1" will be added to the first "9" at the right by the rotation of the dial containing such "9," the rotation being due to the rotation of the pinion-shaft coupled to such dial. When the said "1" has been thus added to the figure "9" on the said dial, the latter will of course be brought to "0" and the finger P on the first dog-spindle to the left will be swung to one side, whereupon that pair of cam-teeth $y$ on the cylinder Y which is arranged to contact with the pin of such dog will move the latter, so as to turn its dial one-tenth of a revolution, which will be from "9" to "0," at the same time swinging the next dog at the left, which is thus engaged by its respective pair of cam-teeth $y$ and moves its dial from "9" to "0," which swings the next transferring-dog at the left, which is then engaged by its cam-teeth, and so on until the dial containing the first left-hand "9" is reached, whereupon this dial will also be set at "0" and the adjoining dial at the left will be set at "1," the dials then showing the number "1,000,000."

If the teeth $y$ on the cylinder were in a straight row similar to the teeth $j$, the above operation of course could not be performed, as all the teeth $y$ would simultaneously come opposite the pins of their respective dogs and the latter, with the exception of the first one at the right, would enter the passages between their teeth before being swung to one side by the fingers on the adjacent right-hand spindles. The teeth $j$ are also arranged helically for reducing the power of the cylinder in restoring the dogs to their normal position. As shown in Fig. 26, all the cam-teeth $y$ and $j$ are arranged on one half of the periphery, the other half carrying no projections at all, this part of the circumference passing by the pins $i$ during the time the dogs are swung into position 2, Figs. 24 and 25. Fig. 24 shows the three positions of the dogs during the carrying of a ten in multiplication and addition. Fig. 25 shows the three positions of the dog in division and subtraction.

Position 1 is the normal position. Position 2 is the position of the dog as caused by the finger P and necessary to engage the teeth $i'$ and $i^2$ with the star-wheels $n'$ as soon as the auxiliary carriage is lowered. Position 3 is the position in which the dog is swung by the cam-teeth $y$, the teeth $i'$ or $i^2$ turning the star-wheel at the same time one-tenth of a revolution. The teeth $j$ restore the dog to the normal position 1.

In order to permit the fingers P of the register-spindles to stay in contacting position with regard to the fingers $m'$ of the transferring-spindles, the former fingers are made wide enough so as to allow the shifting of the auxiliary carriage.

For the purpose of lifting the auxiliary carriage, Figs. 5, 6, and 7, its end plates $B^2$ are provided with studs $b^6$, projecting through slots $b^7$ of the end plates B' of the main carriage, being journaled in levers L', pivotally attached to the end plates B' by means of screws $L^2$. The levers L' carry on their ends rollers $e'$, riding on cams E', fixed to the cylinder Y. The weight of the auxiliary carriage holds the rollers in contact with the cam-faces. For guiding the auxiliary carriage vertically the end plates $B^2$ form slide-boxes for the guide-rods $b^4$, attached to projections $b^5$ of the end plates B' of the main carriage.

The cam-face is shaped so as to hold the auxiliary carriage in its upper position during the first half-rotation of the cylinder and in its lower position during the second half-rotation of the cylinder. The cylinder rotates twice for each turn of the crank on account of the relative proportions of the gear-wheels V and $r$, Fig. 2.

Figure 13:
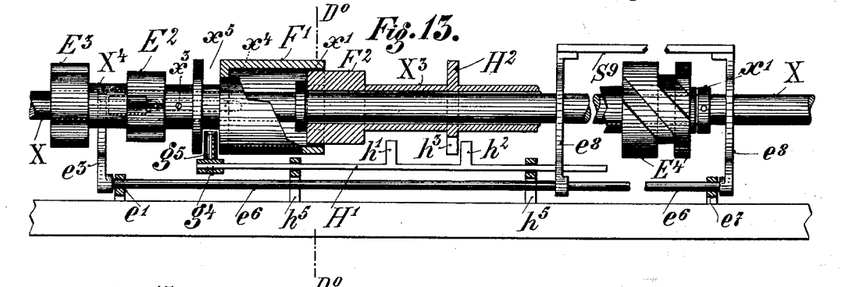
Fig. 13 is an enlarged detail view of the main driving-shaft.

For the purpose of shifting the register-carriage longitudinally on the guide-rods J the main carriage is provided with a bar V', Figs. 2 and 8, journaled at $v^3$ in the end plates B' and carrying, by means of studs $v^2$, a series of rollers $v'$, arranged at intervals equal to the distance from center to center of the pinion-shafts or the register-spindles, the rollers $v'$ being severally engaged by a cam-wheel $E^4$, Figs. 2 and 13, of which Fig. 12 shows the developed surface, and which I term the "carriage-shifting cam," for reference hereinafter. The shaded circles in Fig. 12 indicate the position of the rollers $v'$ with relation to the cam $E^4$ when the crank K stands in its normal position. As will be readily seen from Fig. 12, the register-carriage, during the second fourth of a rotation of the crank K, while roller $e^2$ rides on the incline $E^6$, will be shifted to the left for a distance equal to the interval of two adjacent spindles. During the first, third, and fourth part of a rotation a roller will be engaged in groove $E^5$, and thus secure the carriage. As soon as one roller $v'$ travels over the incline $E^6$ the next roller to the right will enter into the groove $E^5$ throught he opening $E^7$, and so on.

For shifting the carriage longitudinally by hand, in either direction, the following construction is used: The bar $V'$, Fig. 19, carries on its left end a small crank $v^4$, the crank-pin $v^5$ entering in a loop $v^6$ of a stem $v^7$, sliding in a sliding-box $v^{11}$, attached to the end plate $B'$, Fig. 7. A helical spring $v^{10}$, bearing against the slide-box $v^{11}$ and collar $v^8$ of the stem $v^7$, tends to hold the latter down until another collar contacts against the slide-box. The stem $v^7$ projects through a slot $v^{13}$ in the upper plate $K'$, Fig. 1, and carries a knob $v^{12}$. To shift the carriage, lift the said knob $v^{12}$ into the dotted position and move it longitudinally in either direction. The bar $V'$ and the series of rollers $v'$ will be turned into the position marked by the dotted lines. The rollers thus being out of contact with the cam $E^4$ will allow the carriage to be shifted to the desired position. As soon as the knob $v^{12}$ is lowered the rollers $v'$ will engage the cam $E^4$, and thus secure the position of the carriage.

Figure 14:
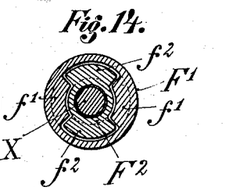
Figs. 14, 15, 16, 17, and 18 are detail views thereof.

It is to be observed that the shifting of the carriage, as well as all the other manipulations, as shifting the levers D and G, the studs $k$, &c., have to take place while the crank K is in its normal position. The register-carriage is shifted automatically in the operation of multiplication and division, while it remains stationary when the apparatus is used for addition and subtraction. Fig. 13 shows the mechanism employed for this purpose. A sleeve $X^3$, loosely mounted on the shaft X, between two collars $x'$ of the latter, carries on one end the carriage-shifting cam $E^4$ and on its other end a coupling $F^2$, having two clutches $f^2$, Fig. 14. A sleeve $X^4$, carrying the cams $E^2$ $E^3$ and a coupling $F'$, having two clutches $f'$, rotates with the main shaft, but is longitudinally movable on said shaft, the groove $x^4$ and pin $x^3$ permitting a longitudinal movement, as previously stated. The couplings $F'$ and $F^2$ may be engaged or not, according to the position of a lever G, Figs. 1 and 5. The lever G carries a knob $g'$ and may be swung into four different positions, its pointer $g^2$ then being opposite the marks "Addition," "Multiplication," "Division," or "Subtraction." In the figures referred to the lever is in its position for the operation of multiplication. Any forward or backward movement of the lever G is imparted, by means of a vertical shaft $g^3$, to another lever $g^4$, carrying on its end a roller $g^5$, entering into a groove $x^5$ of the coupling $F'$, and thus shifting the sleeve $X^4$ forward or backward. In the operation of multiplication the roller $e^2$ rides on cam $E^2$, and the couplings $F'$ and $F^2$ are engaged, as shown in Figs. 2, 13, and 14, the latter being a section on line $D^0$ $D^0$, Fig. 13. Any rotation of the main shaft X is thereby imparted, by the sleeve $X^4$, to the sleeve $X^3$, carrying the carriage-shifting cam $E^4$.

When the lever G is swung backward to the position marked "Addition," the roller $e^2$ will ride on the same cam, $E^2$, as before, but the couplings $F'$ and $F^2$ will be out of engagement, and, as the cam $E^4$ will not rotate, the carriage will rest stationary when the crank K is turned.

Figure 18:
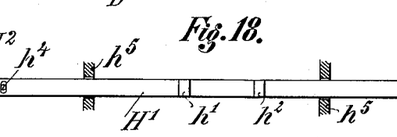
Figure 19:
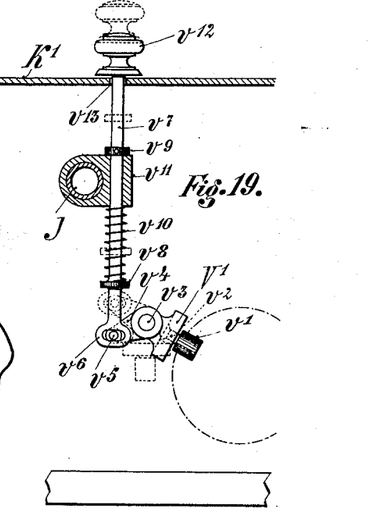
Fig. 19 is an enlarged detail view of the devices for shifting the carriages by hand.

To prevent any accidental rotation of the sleeve $X^3$ during the operation of addition, a horizontal lock-bar $H'$ is pivotally attached to the lever $g^4$, the stud of the roller $g^5$ entering into a loop $h^4$ of the lock-bar $H'$, Figs. 13 and 18. The latter is guided horizontally in two guide-boxes $h^5$ and carries two teeth $h'$ and $h^2$, which severally engage an opening $h^3$ of a lock-disk $H^2$ of the sleeve $X^3$, Fig. 17. It will be seen from Figs. 1, 2, 5, and 13 that when the lever G is swung from "Multiplication" to "Addition" the lever $g^4$ will shift the lock-bar $H'$ to the left, and tooth $h^2$ will enter the opening $h^3$ of disk $H^2$. This is, however, only possible when the crank is in its normal position.

When the lever G is in its position for division, the roller $e^2$ will ride on cam $E^3$, Figs. 2, 13, and 16, the couplings $F'$ and $F^2$ will be engaged, and the teeth $h'$ and $h^2$ will not interfere with the rotation of the sleeve $X^3$. As soon as the lever G is carried to the position of "Subtraction" the clutches $f'$ of coupling $F'$, Figs. 13 and 14, will be outside to the right of the coupling $F^2$, while the clutches $f^2$ of coupling $F^2$ enter inside of coupling $F'$, the rotation of the latter not being imparted to $F^2$. At the same time tooth $h^2$ enters into the opening $h^3$, and thus secures the sleeve $X^3$ against accidental rotation.

To illustrate more clearly the succession or simultaneousness of the functions of the different parts of the machine thus far described during one complete turn of the crank K, a diagram, Fig. 27, has been prepared in which the sectors corresponding to the different functions are combined and numbered from "1" to "22." Two arrow-heads mark the points at which each function starts and where it is terminated. Any straight line drawn from the center to the periphery of the diagram will cut arrows representing functions which occur simultaneously.

The diagram is divided into four sectors, (marked I, II, III, and IV,) each sector corresponding to a fourth part of a revolution of the crank K.

During the first fourth part of a rotation the following will occur: first, engaging the bevel-wheels of sleeves $S^8$ and $S^{15}$ with the bevel-wheels of the register and indicator spindles, Figs. 2, 4, and 21; second, first outward movement of the controlling-block and of the racks for so many graduations as are represented by the recesses in the tens-plates and primary rotation of the registering-spindles; third, the auxiliary carriage in the upper position, transferring-dogs not engaged with the star-wheels $n'$; fourth, the tens-plates are opposite the racks; fifth, lowering of the auxiliary carriage and engaging the transferring-dogs with the star-wheels. During the second fourth part of a rotation the following will occur: sixth, disengaging of bevel-wheels on pinion-shafts and register-spindles; seventh, first backward movement of the racks by means of cross-bar Q and shifting of the register-carriage one place to the left; eighth, carrying the tens obtained by the primary rotation of the register-spindles by means of transferring-dogs moved by the cam-teeth of the cylinder Y; ninth, lifting of the auxiliary carriage to its upper position, thus disengaging transferring-dogs and star-wheels; tenth, the transferring-dogs are restored to their normal position by means of cam-teeth $j$ on cylinder Y; eleventh, shifting of the controlling-block transversely until the units-plates are opposite the racks. During the third fourth part of a rotation the following occur: twelfth, engaging the bevel-wheels of the pinion-shafts and register-spindles; thirteenth, the transferring-dogs out of engagement with the star-wheels; fourteenth, the units-plates of the controlling-block opposite the racks; fifteenth, second outward movement of the racks and secondary rotation of the register-spindles and rotation of the indicator-spindles; sixteenth, lowering of the auxiliary carriage, thus engaging the star-wheels with the transferring-dogs. During the last fourth of a rotation the following will occur: seventeenth, disengaging bevel-wheels, as in 6; eighteenth, carrying the tens obtained by the secondary rotation of the register-spindles; nineteenth, second backward movement of the racks; twentieth, lifting of the auxiliary carriage and disengaging the transferring-dogs and star-wheels; twenty-first, restoring the transferring-dogs to the normal position; twenty-second, shifting the controlling-block transversely back to the normal position.

The above operations will be repeated at each rotation of the crank when the apparatus is used for multiplication. If the apparatus is to be used for addition or subtraction, the lever G must be swung into the respective positions and the multiplier-lever D must be placed on figure "1," an addition being considered as a multiplication by the factor "1."

As already stated, the register-carriage remains stationary when the apparatus is used for addition and subtraction.

The different numbers to be added are arranged successively on the keyboard A', and the crank K is turned once simultaneously for each number thus arranged.

The operation of subtraction is similar, with the exception of the position of lever G.

In division the dividend is arranged on keyboard A', and must be transferred to the register-dials by the operation of addition. After this the apparatus is set for division and the divisor arranged on keyboard A' in such a manner that the divisor appears at the holes $K^3$ exactly above the first figures to the left of the dividend, appearing at $K^4$. As when calculating on paper, the first figure of the quotient is estimated, the multiplier-lever D is shifted to such figure on scale $A^2$, and the crank K is turned once, and so on for each place of the quotient. A mistake in estimating too high a number for the quotient will be noticed as soon as the crank is turned. If the division has been made with too high a number, all the dials on $K^4$ to the left of the divisor will show "9" instead of "0." In this case the apparatus is set for addition, and the divisor is added once to the remainder, and thus a remainder is obtained, as if the division had been made with the next smaller figure. If we divide with too small a number, the divisor is subtracted once from the remainder to get the right result. Instead of correcting a mistake by adding or subtracting the divisor to or from the remainder a mistake is also corrected by multiplying with the number with which the division was wrongly made; but in this case the carriage must be shifted one place before and after this intermediate multiplication.

Instead of executing division in the described way it may just as well be executed as successive subtractions, as in many of the former machines.

After the dividend and divisor are arranged the crank K is turned until the first numbers of the remainder, at $K^4$, are smaller than the divisor at $K^3$. Then the carriage is shifted one place to the left and the same manipulation repeated for each place of the quotient.

The indicating of the quotient, as done by the recessed plate $O^b$, the rack $Z^0$, pinion $T^5$, and the indicator-spindles, has yet to be explained. In comparing Figs. 10 and 11, which represent the plates which control the rotation of the indicator-spindles, it will be seen that the portion O has no recess, while the recess 1 on $I^b$ has one and the corresponding recess on $O^b$ nine graduations. Therefore in multiplication with the number "1" the rack Z' will be moved longitudinally for one graduation, and thus turn the indicator-pinion and the indicator-dial by means of bevel-wheels $S^{15}$ and $S^{16}$ one graduation and turn the dial C from "0" to "1." In division the bevel-wheels $S^{14}$ and $S^{16}$ will be engaged and the pinion $T^5$ will be shifted on rack $Z^0$. As shown in Fig. 21, the collar $S^{18}$, entering into the slot $S^{17}$ of the bar $S^9$, shifts the pinion $T^5$ alternately into or out of engagement with the racks $Z^0$ or $Z'$, according to whether the cam $E^2$ or the cam $E^3$ is opposite the roller $e^2$.

In dividing with the divisor "1" the rack $Z^0$ will be moved for nine graduations as correspond to the recess 1 on $O^b$. The pinion $T^5$ and the record-spindle will therefore be turned nine graduations in the opposite direction, as in multiplication. As the record-dial C is in its normal position, its "0" will first appear at $K^2$, and after nine-tenths of a rotation to the right, Fig. 7, the desired "1" will appear at $K^2$.

In dividing with the divisor "2" the dial C is turned eight graduations to the right and shows "2," while in dividing with "9" it will only be turned one-tenth of a revolution, and thus show the required "9."

As in multiplication and division the carriage is shifted during each partial multiplication, the record-spindle to the right will next come into engagement with the record pinion-shaft, and thus show at $K^2$ the right multiplier or quotient. Fig. 1 shows how the two factors and the result of $42,718 \times 315 = 13,456,170$ will be shown on the apparatus.

It is only a convenience to construct the apparatus in such a way that the carriage is shifted to the left, the multiplicand arranged to the left of the keyboard $A'$, and the multiplication started at the left of the multiplier. To arrange the multiplicand at the right and to start multiplication at the right of the multiplier would require the transferring of the units of the partial products first, and then the shifting of the carriage one place to the right before the tens could be transferred. As will be seen from the above description, this would only require a slight change in the arrangement of the controlling-block and the carriage-shifting cam $E^4$.

Instead of having separate plates to correspond to the tens and units of the different products it would be just as well to make plates of double the number of recesses and mark the odd numbers tens and the even numbers units recesses. This would only require a slight change in the setting mechanism for the controlling-block, and it is not to be considered as an improvement from those variations where pairs of controlling devices are used.

The normal position of the apparatus before an operation is started requires the crank K to be in the position shown in Figs. 2 and 3, the register-carriage it its outmost position to the right, the knob $v^{12}$ being to the right of the slot $v^{13}$, the levers D and G, as well as the studs $k$, in the position required by the example to be calculated, the indicator-dials at $K^2$ and the register-dials at $K^4$ being on "0."

To set the indicator and the register-dials to their zero position, the following mechanism is used, Figs. 1, 4, and 7:

Two racks $N^2 N^3$ are guided on the main carriage, and adapted to engage with the mutilated cog-wheels N N' on the register and indicator spindles. The cog-wheels, Fig. 7, originally had ten teeth, one tooth being cut out. The racks $N^2 N^3$ are held in their normal position, out of engagement with the mutilated cog-wheels, by means of springs $n^6$, fixed to a projection $n^5$ of the racks and to the end plate B' of the main carriage.

The racks carry on their other ends knobs $n^9 n^{10}$ by means of studs $n^7 n^8$, projecting through slots $n^{11} n^{12}$ in the top plate K'.

When the racks are shifted from their normal position to the left, they will engage and turn all the mutilated wheels which are out of their zero position until the openings where the teeth have been cut out are opposite the racks and all the dials are on "0." A further movement to the left, as well as the backward movement of the racks, will not impart any rotation to those dials which are in their normal (zero) position. To illustrate this clearly, in Fig. 7 the rack $N^3$ is shown in engagement with its respective mutilated wheels, while $N^3$ is not in engagement.

To engage and disengage the racks $N^2 N^3$, they are provided with slots $n^4$, in which enter pins $n^3$, fixed to the main carriage, which allow the racks to be approached to the mutilated wheels, as may be readily seen from Fig. 7, and hold them in that position until the knobs $n^9 n^{10}$ are carried back to their normal position.

Figs. 28 to 31 illustrate a different arrangement of the controlling devices, as they may be used in connection with the other parts of the machine illustrated and described above. This arrangement allows also the working of the apparatus automatically by means of a suitable motor, thus doing away with the hand-crank K. Instead of mounting the recessed plates in a controlling-block they are fixed to their respective racks Z. To impart to the racks the necessary longitudinal motion, a comb $C^3$, with teeth $c^3$ long enough to engage the deepest recesses of the plates, is moved horizontally by means of guide-rods $Q^2$, sliding in guide-boxes $Q'$, fixed to the frame. The comb $C^3$ is set opposite the recesses by means of a keyboard containing ten keys numbered from "0" to "9" and arranged in two rows. The keys $A^3$ are held in their normal position by means of helical springs $a^4$, Fig. 29, bearing against a collar $a^3$ and a guide-piece $a^5$, fixed to the frame. On the lower end of the stems $a^2$ is fixed a number of teeth adapted to engage in a toothed cylinder $A^4$. This cylinder $A^4$ is mounted on a shaft $d^8$, carrying two gear-wheels $d^7$ and a notched disk $P^4$ and having its bearings at $d^9$. The gear-wheels $d^7$ engage into racks $d^{10}$, fixed to the horizontal guides $A^3$, the latter being provided to guide the comb $C^3$. The teeth on the lower ends of the keys $A^3$ are so arranged as to turn the cylinder $A^4$ for the number of graduations indicated by the figure on the key depressed, and thus set the comb opposite the recesses of which said figures form one factor The leaf-spring $P^5$, Fig. 31, with its point $p^5$ entering into the notches $p^4$ of the disk $P^4$, secures the shaft $d^8$, and also the comb $C^3$, in its position. As soon as a key $A^3$ returns to its normal position the cylinder $A^4$ will be turned in the opposite direction and thus restore the guides $D^3$ and the comb $C^3$ to their normal (zero) position. The end play of a key, after setting of the comb $C^3$ is completed, is used for uncogging a suitable motor. For this purpose the lower end of the key-stem engages a horizontal lever $M^5$, journaled at $M^7$ and carrying on its other end an arm $M^6$, supporting a latch $M^4$. The lever $M^5$ is held in its normal position by means of a spring $M^8$, a projection $m^7$, and a bracket $m^8$, fixed to the frame. When a key is depressed, $M^5$ will be depressed also, and the latch $M^4$, losing its support $M^6$, will fall by its own weight and uncog the nose $m^5$ and the finger $V^5$ of a fly $V^4$, being turned by means of a pinion $V^2$, engaging the gear-wheel V of the main driving-shaft. The gear-wheel $V^3$, connected to the shaft of the motor, will impart motion to the gear-wheel V of the main driving-shaft X and turn it one complete rotation. The nose $m^3$ of a cam $M^3$ engages the nose $m^4$ of the latch $M^4$ during the latter part of the revolution and lifts the latch $M^4$ to its normal position and locks the finger $V^5$ again by the projection $m^5$. The main driving-shaft will not rotate until another key is depressed. To shift the comb $C^3$ transversely in order to get its teeth $c^3$ opposite the units-plates of the racks, an arrangement similar to that described in connection with Fig. 20 is employed. The cam E shifts a roller $c$ horizontally, the latter being crowded against the cam-face by a helical spring $f$. A projection of the stem $R^{11}$ enters into a fork $R^{12}$ of a shaft $R^{13}$ and turns the latter whenever the roller $c$ alters its distance from the center of the cam E. The shaft $R^{13}$ carries, by means of two arms $R^{15}$, a guide-rod $R^{17}$, engaging in a loop $C^4$, fixed to the comb $C^3$ and holding the latter in the required position with relation to the tens and units plates during the time it is moved vertically by means of the keys $A^3$ or horizontally by means of the guide-rods $Q^2$. The comb $C^3$ is guided vertically on guides $d^{15}$, screwed to the forked ends $Q^5$ of the guide-rods $Q^2$. Two cross-bars $Q^6$ connect the free ends of the fork. To allow the transverse movement of the comb in order to get the teeth $c^3$ opposite the units or the tens plates, the guides $d^{15}$ pass through oblong holes $c^4$ in the comb $C^3$. The guides $D^3$ are connected together by means of a cross-piece $D^5$. The guide-rods $d^{14}$ are fixed to the frame and united by means of a top bar $d^{13}$.

Having thus fully described my invention, what I claim as new, and desire to secure by Letters Patent, is—

1. In a calculating-machine, the combination, with a series of recessed plates united at one end, of a frame in which said plates reciprocate, a pair of racks secured to the frame, a pair of cog-wheels, engaging one with each rack, a shaft on which the cog-wheels are mounted, a bevel gear-wheel on the shaft, a pointer, a shaft on which the pointer is mounted, a bevel gear-wheel on the latter shaft, in mesh with the bevel gear-wheel on the cog-wheel shaft, and a scale over which the pointer moves, substantially as set forth.

2. In a calculating-machine, the combination, with a series of recessed plates, of a frame in which the plates reciprocate, a pair of side bars, $Q^2$, provided with ends having transverse slots, a guide-bar, $q^3$, moving in the slots and attached to the plate, means for moving the side rods longitudinally, and mechanism for raising and lowering the plates, substantially as set forth.

3. In a calculating-machine, the combination, with a guide-bar, $q^3$, having projecting ends, $q^4$, of a guide-rod fixed in said projecting ends, a pair of rocker-arms united by a slotted bar through which the guide-rod passes, a rock-shaft on which the rocker-arm is fixed, and means for oscillating the rock-shaft, substantially as set forth.

4. In a calculating-machine, the combination, with a guide-bar, $q^3$, having projecting ends, $q^4$, of a guide-rod fixed in said projecting ends, a pair of rocker-arms united by a slotted bar through which the guide-rod passes, a rock-shaft on which the arm is fixed, a forked rocker-arm fixed on the rock-shaft, a reciprocatory rod provided with a tongue engaging the forked rocker-arm, a roller at the end of the reciprocatory rod, a cam, and a spring normally holding the roller in contact with the cam, substantially as set forth.

5. In a calculating-machine, the combination, with a series of longitudinally-movable racks, and a series of pinion-shafts located transversely of the movable racks, of a stationary rack, $Z^0$, and a series of counting-pinions movable on the pinion-shafts and arranged to be engaged with any desired movable rack or with the stationary rack, substantially as set forth.

6. In a calculating-machine, the combination, with a series of longitudinally-movable racks and a stationary rack, of a series of pinion-shafts located transversely of the racks, a series of counting-pinions movable on the pinion-shafts, a top plate over the pinion-shafts and provided with slots, and with a series of scales parallel to the slots, and a series of keys provided with stems passing through the slots and engaging the counting-pinions, one key for each pinion, each key having an index arranged to be brought into line with any desired graduation on its respective scale, whereby the pinions may be moved into engagement with any desired rack, substantially as set forth.

7. In a calculating-machine, the combination, with a main carriage and a pair of auxiliary carriages mounted in the main carriage, of a transmitting mechanism, means for moving the main carriage toward or from the transmitting mechanism, a device for shifting the auxiliary carriages longitudinally with relation to the main carriage, and mechanism for raising and lowering one auxiliary carriage with relation to the other auxiliary carriage, substantially as set forth.

8. In a calculating-machine, the combination, with a main carriage, a pair of auxiliary carriages mounted in the main carriage, a transmitting mechanism, an arm secured to the main carriage and bearing against a cam, a lever fulcrumed on one auxiliary carriage, and attached to the other, and a cam acting on the end of the lever, whereby, by the action of the cams, all the carriages will be moved toward the transmitting mechanism, and one auxiliary carriage will be raised or lowered with relation to the other, substantially as set forth.

9. In a calculating-machine, the combination, with a carriage, a register-spindle mounted in the carriage, a bevel-wheel on the register-spindle, and a pinion-shaft, of a pair of bevel-wheels on the pinion-shaft, a pair of oppositely-arranged cam-wheels, and mechanism for throwing either cam into operation, whereby either one of the pair of bevel-wheels may be engaged with the bevel-wheel on the register-spindle, and at different portions of a revolution of the cams, substantially as set forth.

10. In a calculating-machine, the combination, with a carriage, a register-spindle mounted in the carriage, and a pinion-shaft, of a pair of bevel-wheels on the pinion-shaft, a bar between the bevel-wheels, an arm attached to the bar, a roller at the end of the arm, a pair of cams, means for shifting the cams so as to severally engage the roller, and a bevel-wheel on the register-spindle arranged between the bevel-wheels on the pinion-shaft.

11. In a calculating-machine, the combination, with a carriage, and a bar attached to the carriage, of a series of rollers revolubly mounted on the bar, and a cam provided with a groove into which the rollers successively enter, substantially as set forth.

12. In a calculating-machine, the combination, with a carriage, and a bar attached to the carriage, of a series of rollers revolubly mounted on the bar, and a cam having a central peripheral groove and two inclined grooves, into which grooves the rollers successively enter, substantially as set forth.

13. In a calculating-machine, the combination, with a carriage, a bar journaled in the carriage, and a series of rollers revolubly mounted on the bar, of a cam provided with a groove into which the rollers enter, and means for rotating the bar to remove the rollers from the groove in the cam, substantially as set forth.

14. In a calculating-machine, the combination, with a carriage, a bar journaled in the carriage, and a series of rollers revolubly mounted on the bar, of a cam provided with a groove into which the rollers enter, a crank on the end of the bar, and a spring-held rod attached to the crank, whereby the rollers may be disengaged from the groove in the cam, substantially as set forth.

15. In a calculating-machine, the combination, with a carriage, a bar journaled in the carriage, a series of rollers revolubly mounted on the bar, a cam provided with a groove, and a crank on the end of the bar, of a pin in the crank, a longitudinally-movable rod mounted in the carriage and provided with a slot into which the pin enters, and a spring normally holding the bar so as to engage the rollers with the cam-groove, substantially as set forth.

16. In a calculating-machine, the combination, with a carriage, a register-spindle mounted therein, a bevel-wheel on the register-spindle, a pinion-shaft, a pair of bevel-wheels on the pinion-shaft, a bar between the bevel-wheels, an arm attached to the bar, a roller on the end of the bar, a revoluble bar attached to the carriage, and a series of rollers on the revoluble bar, of a shaft, a sleeve mounted on the shaft and provided with two cams, a cam having a peripheral groove into which the rollers enter, a clutch-coupling for locking the peripherally-grooved cam with the two cams, and means for shifting either of the two cams into engagement with the roller on the arm, substantially as set forth.

17. In a calculating-machine, the combination, with a carriage and an operating-shaft, of a sleeve splined to the shaft and longitudinally movable thereof, a carriage-shifting cam loose on the shaft, a transmitting mechanism, a register mechanism, a pair of cams on the sleeve arranged to engage the transmitting mechanism with the register mechanism, a hollow cylinder at the end of the sleeve and provided with lugs, a pair of lugs attached to the carriage-shifting cam and arranged to engage with the lugs on the hollow cylinder, or to enter the latter, and means for shifting the sleeve longitudinally, substantially as set forth.

18. In a calculating-machine, the combination, with a series of dogs having pins, and a revoluble cylinder, a series of pairs of helically-arranged cam-teeth fixed on the cylinder, and having passages between them through which the pins may freely pass, of means for moving the dogs so as to engage their pins with the cam-teeth, and a series of helically-arranged cam-teeth fixed on the cylinder and adapted to restore the dogs to their normal position, substantially as set forth.

19. In a calculating-machine, the combination, with a carriage, a series of dogs mounted in the carriage and provided with pins, a revoluble cylinder, a shaft on which the cylinder is mounted, and a series of pairs of cam-teeth fixed on the cylinder, and having passages between them through which the pins normally pass, of means for moving the dogs so as to engage their pins with the pairs of cam-teeth, a series of helically-arranged cam-teeth fixed to the cylinder and adapted to restore the dogs to their normal position, means for shifting the carriage lengthwise, and an arm secured to the carriage and engaging the cylinder, whereby the latter is moved with the carriage, substantially as set forth.

In testimony that I claim the foregoing as my invention I have signed my name in presence of two subscribing witnesses.

OTTO STEIGER.

Witnesses:
ALBERT WEICKMANN,
C. T. PLETZER.